US011663729B2

(12) United States Patent
Guizilini et al.

(10) Patent No.: US 11,663,729 B2
(45) Date of Patent: May 30, 2023

(54) NETWORK ARCHITECTURE FOR THE JOINT LEARNING OF MONOCULAR DEPTH PREDICTION AND COMPLETION

(71) Applicant: Toyota Research Institute, Inc., Los Altos, CA (US)

(72) Inventors: Vitor Guizilini, Santa Clara, CA (US); Rares A. Ambrus, San Francisco, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 67 days.

(21) Appl. No.: 17/176,336

(22) Filed: Feb. 16, 2021

(65) Prior Publication Data
US 2022/0148204 A1    May 12, 2022

Related U.S. Application Data

(60) Provisional application No. 63/112,234, filed on Nov. 11, 2020.

(51) Int. Cl.
*G06T 7/50*    (2017.01)
*B60W 60/00*    (2020.01)
(Continued)

(52) U.S. Cl.
CPC .......... *G06T 7/50* (2017.01); *B60W 30/0956* (2013.01); *B60W 60/001* (2020.02); *G01B 11/22* (2013.01);
(Continued)

(58) Field of Classification Search
CPC .... G06T 7/50; G06T 7/55; G06T 9/00; G06T 2207/10028; G06T 2207/20081;
(Continued)

(56) References Cited

U.S. PATENT DOCUMENTS 10,755,428 B2    8/2020    Aswin
10,803,546 B2    10/2020    Wang et al.
(Continued)

FOREIGN PATENT DOCUMENTS

| CN | 110383340 A | * | 10/2019 | ............ G01C 21/20 |
| CN | 112825134 A | * | 5/2021 | ........ B60W 60/0011 |
| WO | WO-2020188121 A1 | * | 9/2020 | ............ G06T 7/285 |

OTHER PUBLICATIONS

Zhang JM et al, LiStereo: Generate Dense Depth Maps from LIDAR and Stereo Imagery, Jun. 2020, arXiv: 1905.02744v3, 1-8. (Year: 2020).*
(Continued)

*Primary Examiner* — Matthew C Bella
*Assistant Examiner* — Kathleen M Broughton
(74) *Attorney, Agent, or Firm* — Christopher G. Darrow; Darrow Mustafa PC

(57) ABSTRACT

System, methods, and other embodiments described herein relate to determining depths of a scene from a monocular image. In one embodiment, a method includes generating depth features from sensor data according to whether the sensor data includes sparse depth data. The method includes selectively injecting the depth features into a depth model. The method includes generating a depth map from at least a monocular image using the depth model that is guided by the depth features when injected. The method includes providing the depth map as depth estimates of objects represented in the monocular image.

20 Claims, 6 Drawing Sheets

(51) Int. Cl.
| | |
|---|---|
| G01C 21/00 | (2006.01) |
| B60W 30/095 | (2012.01) |
| G06V 10/40 | (2022.01) |
| G06V 20/56 | (2022.01) |
| G01B 11/22 | (2006.01) |
| G01S 17/08 | (2006.01) |
| G01S 17/89 | (2020.01) |
| G06T 9/00 | (2006.01) |

(52) U.S. Cl.
CPC .......... *G01C 21/3815* (2020.08); *G01S 17/08* (2013.01); *G01S 17/89* (2013.01); *G06T 9/00* (2013.01); *G06V 10/40* (2022.01); *G06V 20/56* (2022.01); *B60W 2420/42* (2013.01); *B60W 2420/52* (2013.01); *B60W 2554/20* (2020.02); *B60W 2554/4029* (2020.02); *G06T 2207/10028* (2013.01); *G06T 2207/20081* (2013.01); *G06T 2207/20084* (2013.01); *G06T 2207/30252* (2013.01)

(58) Field of Classification Search
CPC ........... G06T 2207/20084; G06T 2207/30252; G06T 5/50; B60W 30/0956; B60W 60/001; B60W 2420/42; B60W 2420/52; B60W 2554/20; B60W 2554/4029; G01B 11/22; G01C 21/3815; G01S 17/08; G01S 17/89; G06V 10/40; G06V 20/56
See application file for complete search history.

(56) References Cited

U.S. PATENT DOCUMENTS

| | | | |
|---|---|---|---|
| 2019/0295282 A1* | 9/2019 | Smolyanskiy | G01S 17/89 |
| 2019/0387209 A1* | 12/2019 | Yang | H04N 13/271 |
| 2020/0160559 A1* | 5/2020 | Urtasun | G01S 17/86 |
| 2020/0193630 A1 | 6/2020 | Mousavian et al. | |
| 2020/0218979 A1* | 7/2020 | Kwon | G06V 10/763 |
| 2020/0273192 A1 | 8/2020 | Cheng et al. | |

OTHER PUBLICATIONS

Gansbeke WV et al, Sparse and noisy LiDAR completion with RGB guidance and uncertainty, Feb. 2019, arXiv:1902.05356v1, 1-7. (Year: 2019).*
Liu J et al, Fully convolutional multi-scale dense networks for monocular depth estimation, Aug. 2019, IET Computer Vision, 13:5; 443-530. (Year: 2019).*
Zhou, et al., "Unsupervised Learning of Depth and Ego-Motion from Video", CVPR, vol. 2, p. 7, 2017.
Zhou, et al., "Learning Dense Correspondence Via 3d-guided Cycle Consistency", Proceedings of the IEEE Conference on Computer Vision and Pattern Recognition, pp. 117-126, 2016.
Zhang, et al., "Pattern-Affinitive Propagation across Depth, Surface Normal and Semantic Segmentation" In Proceedings of the IEEE Conference on Computer Vision and Pattern Recognition, pp. 4106-4115, 2019.
Zhao, et al., "Towards Better Generalization: Joint Depth-Pose Learning without PoseNet", Proceedings of the IEEE/CVF Conference on Computer Vision and Pattern Recognition, pp. 9151-9161, 2020.
Tang et al., "Learning Guided Convolutional Network for Depth Completion", found at: arXiv:1908.01238v1 [cs.CV] Aug. 3, 2019.
Van Gansbeke et al., "Sparse and noisy lidar completion with rgb guidance and uncertainty", found at: arXiv:1902.05356v1 [cs.CV] Feb. 14, 2019.
Guizilini et al., "3d packing for self-supervised monocular depth estimation", found at: arXiv:1905.02693v4 [cs.CV] Mar. 28, 2020.
Guizilini et al., "Robust semi-supervised monocular depth estimation with reprojected distances", found at: arXiv:1910.01765v1 [cs.CV] Oct. 4, 2019.
Alhashim, et al., "High Quality Monocular Depth Estimation Via Transfer Learning", found at: arXiv:1812.11941v1 [cs.CV]Dec. 31, 2018.
Bian, et al., "Unsupervised Scale-consistent Depth and Ego-motion Learning from Monocular Video", 33rd Conference on Neural Information Processing Systems (NeurIPS 2019), Vancouver, Canada, 2019, pp. 1-11, https://papers.nips.cc/paper/2019/file/6364d3f0f495b6ab9dcf8d3b5c6e0b01-Paper.pdf.
Cheng, et al, "Depth Estimation Via Affinity Learned with Convolutional Spatial Propagation Network", Proceedings of the European Conference on Computer Vision (ECCV), pp. 103-119, 2018.
Choy, et al., "4D Spatio-Temporal ConvNets: Minkowski Convolutional Neural Networks", Proceedings of the IEEE Conference on Computer Vision and Pattern Recognition, 2019, pp. 3075-3084.
Diaz, et al., "Soft Labels for Ordinal Regression", Proceedings of the IEEE Conference on Computer Vision and Pattern Recognition, 2019, pp. 4738-4747, https://openaccess.thecvf.com/content_CVPR_2019/papers/Diaz_Soft_Labels_for_Ordinal_Regression_CVPR_2019_paper.pdf.
Eigen, et al., "Depth Map Prediction from a Single Image using a Multi-Scale Deep Network", In Advances in neural information processing systems, pp. 1-9, https://papers.nips.cc/paper/2014/file/7bccfde7714a1ebadf06c5f4cea752c1-Paper.pdf (2014).
Eldesokey, et al., "Confidence Propagation through CNNs for Guided Sparse Depth Regression", Journal of Latex Class Files, Aug. 2015, pp. 1-14, vol. 14, No. 8, IEEE Transactions on Pattern Analysis and Machine Intelligence.
Fu, et al., "Deep Ordinal Regression Network for Monocular Depth Estimation", Proceedings of the IEEE Conference on Computer Vision and Pattern Recognition, 2018, pp. 2002-2011.
Gan, et al., "Monocular Depth Estimation with Ainity, Vertical Pooling, and Label Enhancement", Computer Vision Foundation, ECCV 2018, pp. 1-16, https://openaccess.thecvf.com/content_ECCV_2018/papers/YuKang_Gan_Monocular_Depth_Estimation_ECCV_2018_paper.pdf.
Geiger, et al., "Vision meets robotics: The KITT dataset". The International Journal of Robotics Research, 32 (11):1231-1237, 2013.
Geiger, et al. "Are we ready for Autonomous Driving? The KITTI Vision Benchmark Suite", Conference on Computer Vision and Pattern Recognition(CVPR), 2012, pp. 1-8, http://www.webmail.cvlibs.net/publications/Geiger2012CVPR.pdf.
Glorot, et al., "Deep Sparse Rectifier Neural Networks", Proceedings of the 14th International Conference on Artificial Intelligence and Statisitics(AISTATS), 2011, pp. 315-323, http://proceedings.mlr.press/v15/glorot11a/glorot11a.pdf.
Godard, et al., "Unsupervised Monocular Depth Estimation with Left-Right Consistency", CVPR, 2017, pp. 271-279, vol. 2, , https://openaccess.thecvf.com/content_cvpr_2017/papers/Godard_Unsupervised_Monocular_Depth_CVPR_2017_paper.pdf.
Godard, et al., "Digging Into Self-Supervised Monocular Depth Estimation", ICCV, 2019, pp. 3828-3838, https://openaccess.thecvf.com/content_ICCV_2019/papers/Godard_Digging_Into_SelfSupervised_Monocular_Depth_Estimation_ICCV_2019_paper.pdf.
Gojcic, et al., "Learning multiview 3d point cloud registration registration", International conference on computer vision and pattern recognition (CVPR), 2020, pp. 1759-1769, https://openaccess.thecvf.com/content_CVPR_2020/papers/Gojcic_Learning_Multiview_3D_Point_Cloud_Registration_CVPR_2020_paper.pdf.
Guizilini, et al., "Semantically-guided Representation Learning for Self-supervised Monocular Depth", Feb. 27, 2020, pp. 1-14, arXiv preprint arXiv:2002.12319, arXiv:2002.12319v1 [cs.CV] Feb. 27, 2020, https://arxiv.org/pdf/2002.12319.pdf.
Guo, et al., "Learning Monocular Depth by Distilling Cross-domain Stereo Networks", Proceedings of the European Conference on Computer Vision (ECCV), 2018, pp. 1-17, https://openaccess.thecvf.com/content_ECCV_2018/papers/Xiaoyang_Guo_Learning_Monocular_Depth_ECCV_2018_paper.pdf.

(56) References Cited

OTHER PUBLICATIONS

Hekmatian, et al., "Conf-Net: Toward High-Confidence Dense 3D Point-Cloud with Error-Map Prediction", found at: arXiv:1907.10148v3 [cs CV] Sep. 19, 2019.
Hu, et al., "Probabilistic Future Prediction for Video Scene Understanding", found at: arXiv:2003.06409v2 [cs.CV] Jul. 17, 2020, pp. 1-20.
Imran, et al., "Depth Coefficients for Depth Completion", IEEE/CVF Conference on Computer Vision and Pattern Recognition (CVPR), pp. 1-10., IEEE, 2019, arXiv:1903.05421v1 [cs.CV] Mar. 13, 2019, https://arxiv.org/pdf/1903.05421.pdf.
Ioffe, et al., "Batch Normalization: Accelerating Deep Network Training by Reducing Internal Covariate Shift", In Proceedings of the 32nd International Conference on International Conference on Machine Learning, p. 448-456, 2015.
Klingner, et al., "Self-Supervised Monocular Depth Estimation: Solving the Dynamic Object Problem by Semantic Guidance", found at: arXiv preprint arXiv:2007.06936, 2020.
Klodt, et al., "Supervising the new with the old: learning SFM from SFM", European Conference on Computer Vision, pp. 713-728. Springer, 2018.
Kuznietsov, et al., "Semi-Supervised Deep Learning for Monocular Depth Map Prediction", in IEEE Conference on Computer Vision and Pattern Recognition, pp. 6647-6655, 2017.
LeCun, et al., "Backpropagation Applied to Handwritten Zip Code Recognition", Neural Computation, 1(4):541-551, 1989.
Lee, et al., "From Big to Small: Multi-Scale Local Planar Guidance for Monocular Depth Estimation", found at: arXiv:1907.10326v4 [cs.CV] Aug. 26, 2019.
Lee,et al., "Deep Architecture with Cross Guidance Between Single Image and Sparse Lidar Data for Depth Completion" IEEE Access, 8:79801-79810, 2020.
Loshchilov, et al., "Decoupled Weight Decay Regularization", In International Conference on Learning Representations, 2019, arXiv:1711.05101v3 [cs.LG] Jan. 4, 2019.
Ma,et al., "Self-Supervised Sparse-to-Dense: Self-Supervised Depth Completion from LiDAR and Monocular Camera", arXiv:1807.00275v2 [cs.CV] Jul. 3, 2018.
Ma, et al., "Rethinking Pseudo-LiDAR Representation", In Proceedings of the European Conference on Computer Vision (ECCV), 2020, arXiv:2008.04582v1 [cs.CV] Aug. 11, 2020.
Ochs, et al., "SDNet: Semantically Guided Depth Estimation Network", In German Conference on Pattern Recognition, pp. 288-302. Springer, 2019, arXiv:1907.10659v1 [cs.CV] Jul. 24, 2019.
Paszke, et al., "Automatic differentiation in pytorch", 31st Conference on Neural Information Processing Systems (In NIPS-W), 2017.
Poggi, et al., "On the uncertainty of self-supervised monocular depth estimation" In Proceedings of the IEEE/CVF Conference on Computer Vision and Pattern Recognition, pp. 3227-3237, 2020.
Qi, et al., "Geonet: Geometric Neural Network for Joint depth and Surface Normal Estimation" In Proceedings of the IEEE Conference on Computer Vision and Pattern Recognition, pp. 283-291, 2018.
Qiu, et al., "DeepLiDAR: Deep Surface Normal Guided Depth Prediction for Outdoor Scene from Sparse LiDAR Data and Single Color Image" in Proceedings of the IEEE Conference on Computer Vision and Pattern Recognition, pp. 3313-3322, 2019.
Silberman, et al., "Indoor Segmentation and Support Inference from RGBD Images" In European Conference on Computer Vision, pp. 746-760. Springer, 2012.
Tang, et al., "Self-supervised 3d keypoint learning for ego-motion estimation", found at: arXiv:1912.03426v1 [cs.CV] Dec. 7, 2019.
Tomasi et al., "Bilateral filtering for gray and color images", n Sixth international conference on computer vision (IEEE Cat. No 98CH36271), pp. 839-846. IEEE, 1998.
Tosi, et al. "Distilled Semantics for Comprehensive Scene Understanding From Videos," In Proceedings of the IEEE/CVF Conference on Computer Vision and Pattern Recognition, pp. 4654-4665, 2020.
Uhrig, et al., "Sparsity Invariant CNNs", In 2017 international conference on 3D Vision (3DV), pp. 1-20. IEEE, 2017, arXiv:1708.06500v2 [cs.CV] Aug. 30, 2017.
Vianney, et al., "RefinedMPL: Refined Monocular PseudoLiDAR for 3D Object Detection in Autonomous Driving", arXiv preprint arXiv:1911.09712, 2019.
Watson, et al., "Footprints and Free Space From a Single Color Image", In Proceedings of the IEEE/CVF Conference on Computer Vision and Pattern Recognition, pp. 11-20, 2020.
Wei, et al., "Enforcing Geometric Constraints of Virtual Normal for Depth Prediction", found at: arXiv:1907.12209v2 [cs. CV] Aug. 1, 2019.
Yang, et al., "D3vo: Deep Depth, Deep Pose and Deep Uncertainty for Monocular Visual Odometry," In Proceedings of the IEEE/CVF Conference on Computer Vision and Pattern Recognition, pp. 1281-1292, 2020.
Yang, et al., "Deep Virtual Stereo Odometry: Leveraging Deep Depth Prediction for Monocular Direct Sparse Odometry" arXiv preprint arXiv:1807.02570, 2018.
Yin, et al., "Enforcing Geometric Constraints of Virtual Normal for Depth Prediction", The IEEE International Conference on Computer Vision (ICCV), 2019.
Yin et al., "GeoNet: Unsupervised Learning of Dense Depth, Optical Flow and Camera Pose", Proceedings of the IEEE Conference on Computer Vision and Pattern Recognition (CVPR), vol. 2, 2018.
Zhang, et al., "DFineNet: Ego-Motion Estimation and Depth Refinement from Sparse, Noisy Depth Input with RGB Guidance", found at: arXiv:1903.06397v4 [cs.CV] Aug. 14, 2019.
Zhao et al., "Adaptive Context-Aware Multi-Modal Network for Depth Completion", found at: arXiv:2008.10833v1 [cs.CV] Aug. 25, 2020.
Yoon et al., "Balanced Depth Completion between Dense Depth Inference and Sparse Range Measurements via KISS-GP", found at: arXiv:2008.05158v1 [cs.CV] Aug. 12, 2020.
Zhang et al., "Deep Depth Completion of a Single RGB-D Image", found at: arXiv:1803.09326v2 [cs.CV] May 2, 2018.
Zhang et al., "S&CNet: Monocular Depth Completion for Autonomous Systems and 3D Reconstruction", found at: arXiv:1907.06071v2 [eess.IV] Aug. 29, 2019.
Xu et al., "Depth Completion from Sparse LiDAR Data with Depth-Normal Constraints", found at: arXiv:1910.06727v1 [cs.CV] Oct. 15, 2019.

\* cited by examiner

NETWORK ARCHITECTURE FOR THE JOINT LEARNING OF MONOCULAR DEPTH PREDICTION AND COMPLETION

CROSS-REFERENCE TO RELATED APPLICATIONS

This application claims benefit of U.S. Provisional Application No. 63/112,234, filed on, Nov. 11, 2020, which are herein incorporated by reference in their entirety.

TECHNICAL FIELD

The subject matter described herein relates, in general, to systems and methods for determining depths of a scene from a monocular image, and, more particularly, to a unique network architecture that performs depth prediction and depth completion.

BACKGROUND

Various devices that operate autonomously or that provide information about a surrounding environment often use sensors that facilitate perceiving obstacles and additional aspects of the surrounding environment. As one example, a robotic device uses information from the sensors to develop awareness of the surrounding environment in order to navigate through the environment and avoid hazards. In particular, the robotic device uses the perceived information to determine a 3-D structure of the environment so that the device may distinguish between navigable regions and potential hazards. The ability to perceive distances using sensor data provides the robotic device with the ability to plan movements through the environment and generally improve situational awareness about the environment.

In one approach, the robotic device may employ monocular cameras to capture images of the surrounding environment. While this approach can avoid the use of expensive light detection and ranging (LiDAR) sensors, the captured images do not explicitly include depth information. Instead, the robotic device can implement processing routines that derive depth information from the monocular images. Using monocular images alone to derive depth information can encounter difficulties, such as depth inaccuracies and various types of aberrations. Similarly, using LiDAR data alone to provide depth information also presents difficulties, such as high computational loads from the amount of data or issues with depth completion when the data is sparse. Consequently, difficulties persist with deriving depth data in a reliable manner.

SUMMARY

In one embodiment, example systems and methods relate to a novel network architecture for performing depth prediction and depth completion. As previously noted, different approaches to providing information about depth are generally associated with different types of sensor data. Moreover, the separate approaches generally suffer from different difficulties. For example, in the context of using monocular images, inaccuracies in metric scale can be a difficulty, whereas in the context of using explicit range data (e.g., LiDAR data), computational requirements can represent a specific difficulty.

Therefore, in one arrangement, a novel network architecture is disclosed that leverages both monocular images and range data (i.e., sparse depth data) to provide an improved output about the depth of aspects depicted in the monocular images/range data. For example, the novel network architecture includes a depth model that can use monocular images alone to provide depth estimates or that can also use sparse depth data provided via an integrated sparse auxiliary network (SAN) to derive improved depth estimates. Thus, the depth model can be said to be performing depth prediction and/or depth completion depending on the data that is available via the inputs.

As such, the depth model is more robust than a model utilizing a single input stream since the depth model can selectively integrate the sparse depth data into the depth estimates as the sparse depth data is available. That is, for example, the sensors of the device (e.g., a vehicle) may encounter difficulties, such as hardware failures during operation. As such, when the sparse depth data is unavailable, the depth model is still capable of producing depth estimates according to the monocular image. Moreover, because the depth model can operate without the sparse depth data, the depth model can be leveraged in various configurations that provide monocular images without explicit depth data, thereby improving the usability of the depth model overall.

In any case, the depth model implements an additional encoder, which is referred to herein as the sparse auxillary network (SAN), to process the sparse depth data and inject depth features derived from the sparse depth data into an encoder/decoder structure of the depth model. In at least one arrangement, the SAN injects the depth features via skip connections of encoder/decoder structure. The skip connections provide, for example, residual information about the encoding of image features at different resolutions between the encoder and the decoder. Thus, the SAN injects the depth features via the skip connections according to corresponding spatial dimensions of the image features, respectively. The depth model concatenates the image features and the depth features and provides the concatenated features into the decoder of the encoder/decoder structure, which then produces the depth estimates. In this way, the disclosed novel network architecture functions to improve the depth estimates through the use of monocular images in combination with sparse depth data while providing a robust framework.

In one embodiment, a depth system is disclosed. The depth system includes one or more processors and a memory communicably coupled to the one or more processors. The memory stores a network module including instructions that, when executed by the one or more processors, cause the one or more processors to generate depth features from sensor data according to whether the sensor data includes sparse depth data. The network module includes instructions to selectively inject the depth features into a depth model. The network module includes instructions to generate a depth map from at least a monocular image using the depth model that is guided by the depth features when injected. The network module includes instructions to provide the depth map as depth estimates of objects represented in the monocular image.

In one embodiment, a non-transitory computer-readable medium including instructions that when executed by one or more processors cause the one or more processors to perform various functions is disclosed. The instructions include instructions to generate depth features from sensor data according to whether the sensor data includes sparse depth data. The instructions include instructions to selectively inject the depth features into a depth model. The instructions include instructions to generate a depth map from at least a monocular image using the depth model that is guided by the depth features when injected. The instructions include instructions to provide the depth map as depth estimates of objects represented in the monocular image.

In one embodiment, a method is disclosed. The method includes generating depth features from sensor data according to whether the sensor data includes sparse depth data. The method includes selectively injecting the depth features into a depth model. The method includes generating a depth map from at least a monocular image using the depth model that is guided by the depth features when injected. The method includes providing the depth map as depth estimates of objects represented in the monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
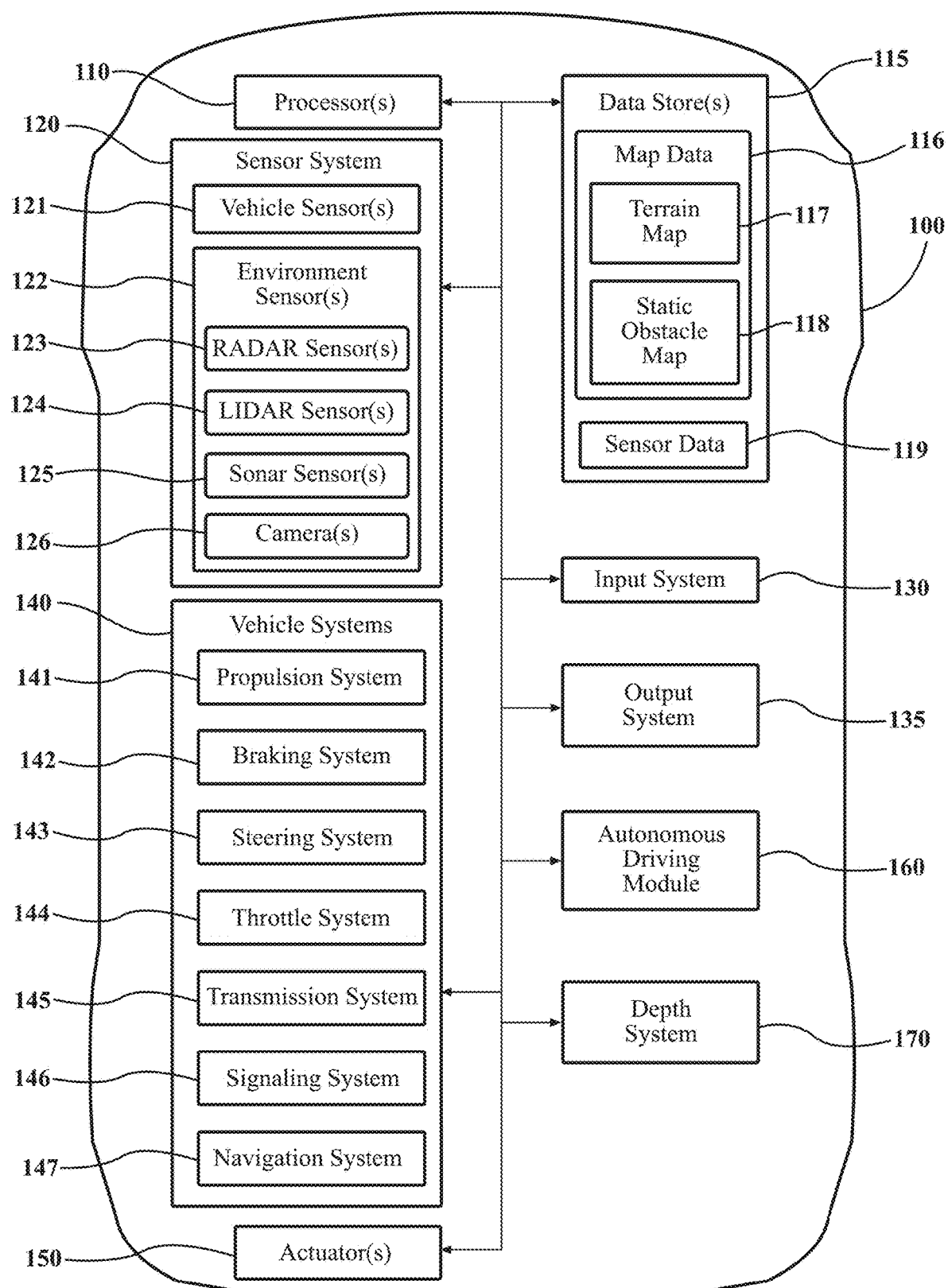
FIG. 1 illustrates one embodiment of a vehicle within which systems and methods disclosed herein may be implemented.

Systems, methods, and other embodiments associated with a novel network architecture for performing depth prediction and depth completion are disclosed. As previously noted, different approaches to providing information about depth are generally associated with different types of sensor data. Moreover, the separate approaches generally suffer from different difficulties. For example, in the context of using monocular images, inaccuracies in metric scale can be a difficulty that arises from using monocular images without a source of ground truth depth. Additionally, in the context of using explicit range data (e.g., LiDAR data), computational requirements from the quantity of data and/or extrapolating sparse data into a complete representation can represent a specific difficulty with acquiring comprehensive depth information.

Therefore, in one arrangement, a novel network architecture is disclosed that leverages both monocular images and range data (i.e., sparse depth data) to provide an improved depth map as an output. For example, the novel network architecture includes a depth model that can use information in addition to monocular images to provide depth estimates. The depth model uses monocular images and can also selectively integrate sparse depth data into the process of generating the depth map when available. To achieve this, in one arrangement, the depth model includes an additional structure in the form of an integrated sparse auxiliary network (SAN) that functions alongside an encoder/decoder structure of the depth model.

As such, the depth model is more robust than a model utilizing a single input stream since the depth model can selectively integrate the sparse depth data into the depth estimates as the sparse depth data is available. For example, the sensors of the device (e.g., a vehicle) may encounter difficulties, such as hardware failures, software failures, or other circumstances during operation that make the explicit depth data unavailable. As such, when the sparse depth data is unavailable, the depth model is still capable of producing depth estimates according to the monocular image.

In any case, the depth model implements an additional encoder, which is referred to herein as the sparse auxillary network (SAN), to process the sparse depth data. The SAN is a machine learning algorithm, such as a convolutional neural network (CNN). The SAN accepts range information in the form of the sparse depth data from a range sensor and outputs depth features. The sparse depth data is range/distance information provided by a range sensor, such as a LiDAR or other range sensor. The depth data is referred to as being sparse since the depth data is not provided on a per-pixel basis as in the case of a depth map corresponding to a monocular image but instead may sparsely depict distances across an observed scene.

The depth model, in at least one arrangement, injects depth features derived from the sparse depth data into an encoder/decoder structure of the depth model. In at least one configuration, the SAN injects the depth features via skip connections of encoder/decoder structure. The skip connections provide, for example, residual information about the encoding of image features at different resolutions between the encoder and the decoder. Thus, the SAN injects the depth features via the skip connections according to corresponding spatial dimensions of the image features. The depth model concatenates the image features and the depth features and provides the concatenated features into the decoder of the encoder/decoder structure to provide the depth features as a passive input into the decoder. In this way, the disclosed novel network architecture functions to improve the depth estimates through the use of monocular images in combination with sparse depth data while providing a robust framework that continues to function in the absence of the sparse depth data.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, observes surroundings to provide determinations therefrom, and thus benefits from the functionality discussed herein. In yet further embodiments, the vehicle 100 may be a statically mounted device, an embedded device, or another device that uses monocular images to derive depth information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a depth system 170 that functions to generate depth estimates (i.e., depth maps) using a novel network architecture that can employ multiple sources of information. Moreover, while depicted as a standalone component, in one or more embodiments, the depth system 170 is integrated with the autonomous driving module 160, the camera 126, or another component of the vehicle 100. Additionally, as noted previously, one or more components of the depth system 170 may be cloud-based elements that are remote from the vehicle 100. The noted functions and methods will become more apparent with a further discussion of the figures.

Figure 2:
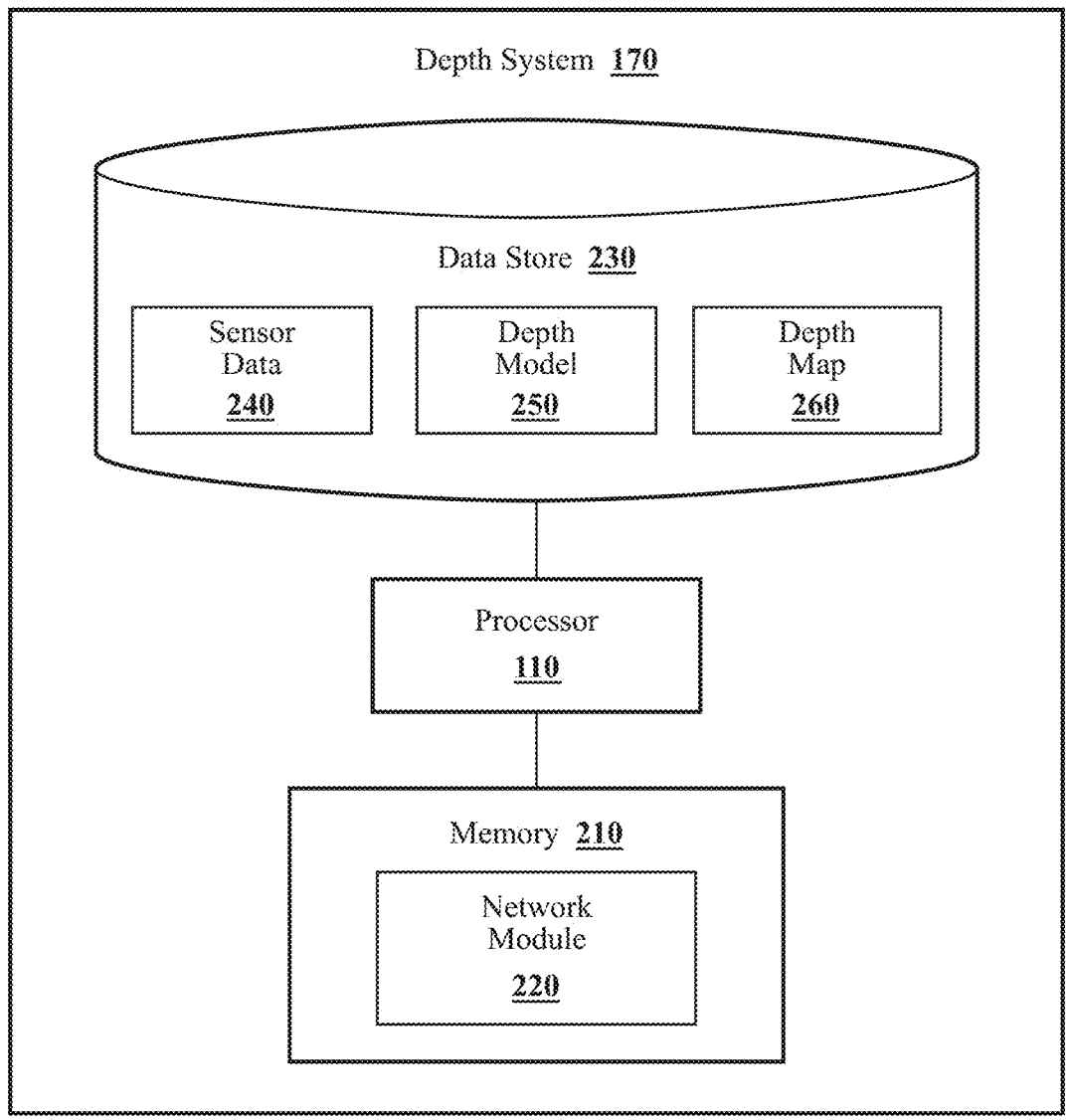
FIG. 2 illustrates one embodiment of a depth system that is associated with providing depth estimates according to monocular images and sparse depth data.

With reference to FIG. 2, one embodiment of the depth system 170 is further illustrated. The depth system 170 is shown as including a processor 110. Accordingly, the processor 110 may be a part of the depth system 170, or the depth system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor, such as a microprocessor that is capable of performing various functions as described herein. In one embodiment, the depth system 170 includes a memory 210 that stores the network module 220 and/or other modules that may function in support of generating depth information. The memory 210 is a random-access memory (RAM), read-only memory (ROM), a hard disk drive, a flash memory, or other suitable memory for storing the module 220. The network module 220 is, for example, computer-readable instructions that, when executed by the processor 110, cause the processor 110 to perform the various functions disclosed herein. In further arrangements, the network module 220 is a combination of logic gates, an integrated circuit, or a purpose-built processor.

Furthermore, in one embodiment, the depth system 170 includes a data store 230. The data store 230 is, in one embodiment, an electronic data structure stored in the memory 210 or another data store, and that is configured with routines that can be executed by the processor 110 for analyzing stored data, providing stored data, organizing stored data, and so on. Thus, in one embodiment, the data store 230 stores data used by the module 220 in executing various functions. For example, as depicted in FIG. 2, the data store 230 includes sensor data 240, a depth model 250, and a depth map 260 along with, for example, other information that is used and/or produced by the module 220.

The sensor data 240 includes, for example, monocular images from the camera 126 or another imaging device. The monocular images are generally derived from one or more monocular videos that are comprised of a plurality of frames. As described herein, the monocular images are, for example, images from the camera 126 or another imaging device that is part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images without a specific depth modality.

An individual monocular image itself includes visual data of the FOV that is encoded according to an imaging standard (e.g., codec) associated with the camera 126 or another imaging device that is the source. In general, characteristics of a source camera (e.g., camera 126) and the video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model 250 derives the depth map/estimates.

Figure 3A:
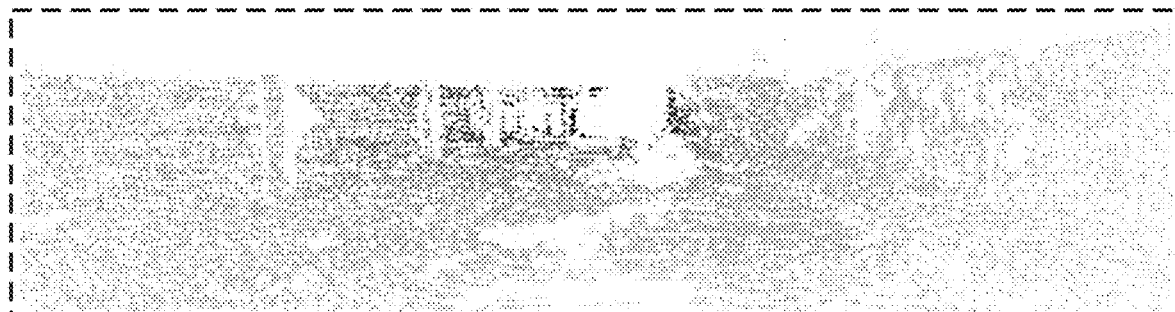
FIGS. 3A-C illustrate different examples of depth data.

Additionally, the sensor data 240, in one or more arrangements, further includes depth data about a scene depicted by the associated monocular images. The depth data indicates distances from a range sensor that acquired the depth data to features in the surrounding environment. The depth data, in one or more approaches, is sparse or generally incomplete for a corresponding scene such that the depth data includes sparsely distributed points within a scene that are annotated by the depth data as opposed to a depth map (e.g., depth map 260) that generally provides comprehensive depths for each separate depicted pixel. Consider FIGS. 3A, 3B, and 3C, which depict separate examples of depth data for a common scene. FIG. 3A depicts a depth map 300 that includes a plurality of annotated points generally corresponding to an associated monocular image on a per-pixel basis. Thus, the depth map 300 includes about 18,288 separate annotated points.

Figure 3B:
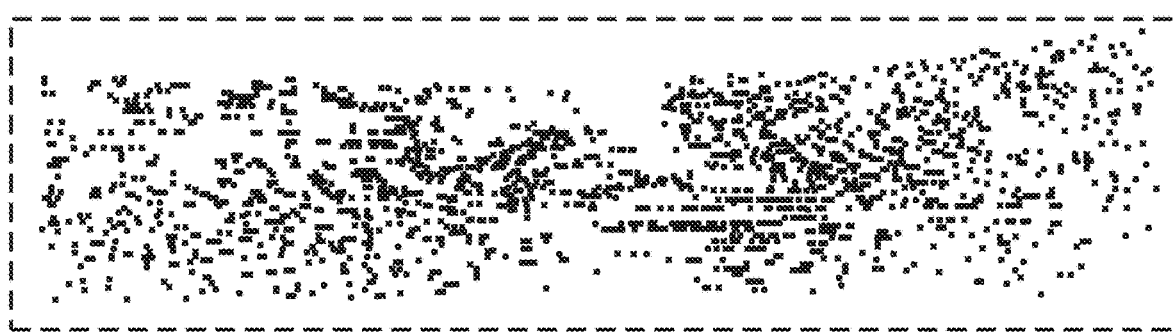
Figure 3C:
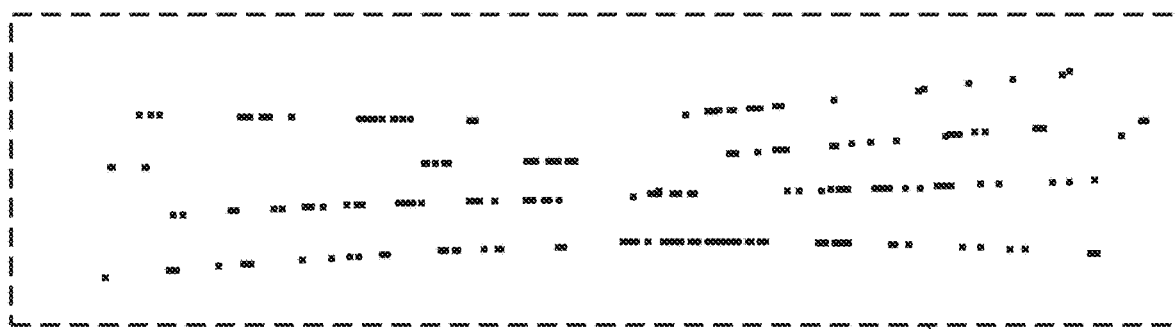

By comparison, FIG. 3B is an exemplary 3D point cloud 310 that may be generated by a LiDAR device having 64 scanning beams. Thus, the point cloud 310 includes about 1,427 separate points. Even though the point cloud 310 includes substantially fewer points than the depth map 300, the depth data of FIG. 3B represents a significant cost to acquire over a monocular video on an image-by-image basis. These costs and other difficulties generally relate to an expense of a robust LiDAR sensor that includes 64 separate beams, difficulties in calibrating this type of LiDAR device with the monocular camera, storing large quantities of data associated with the point cloud 310 for each separate image, and so on. As an example of sparse depth data, FIG. 3C depicts a point cloud 320. In the example of point cloud 320, a LiDAR having 4 beams generates about 77 points that form the point cloud 320. Thus, in comparison to the point cloud 310, the point cloud 320 includes about 5% of the depth data as the point cloud 310, which is a substantial reduction in data. However, the sparse information depicted by point cloud 320 is generally insufficient to develop a comprehensive assessment of the surrounding environment.

As an additional comparison of the FIGS. 3A-3C, note that within FIGS. 3A and 3B, the depth data is sufficiently dense to convey details of existing features/objects such as vehicles, etc. However, within the point cloud 320 of FIG. 3C, the depth data is sparse or, stated otherwise, the depth data vaguely characterizes the corresponding scene according to distributed points across the scene that do not generally provide detail of specific features/objects depicted therein. Thus, this sparse depth data that is dispersed in a minimal manner across the scene may not provide enough data for some purposes.

While the depth data is generally described as originating from a LiDAR, in further embodiments, the depth data may originate from a stereo camera, radar, or another range sensor. Furthermore, the depth data itself generally includes depth/distance information relative to a point of origin, such as the range sensor that may be further calibrated in relation to the camera 126, and may also include coordinates (e.g., x, y within an image) corresponding with separate depth measurements.

Figure 4:
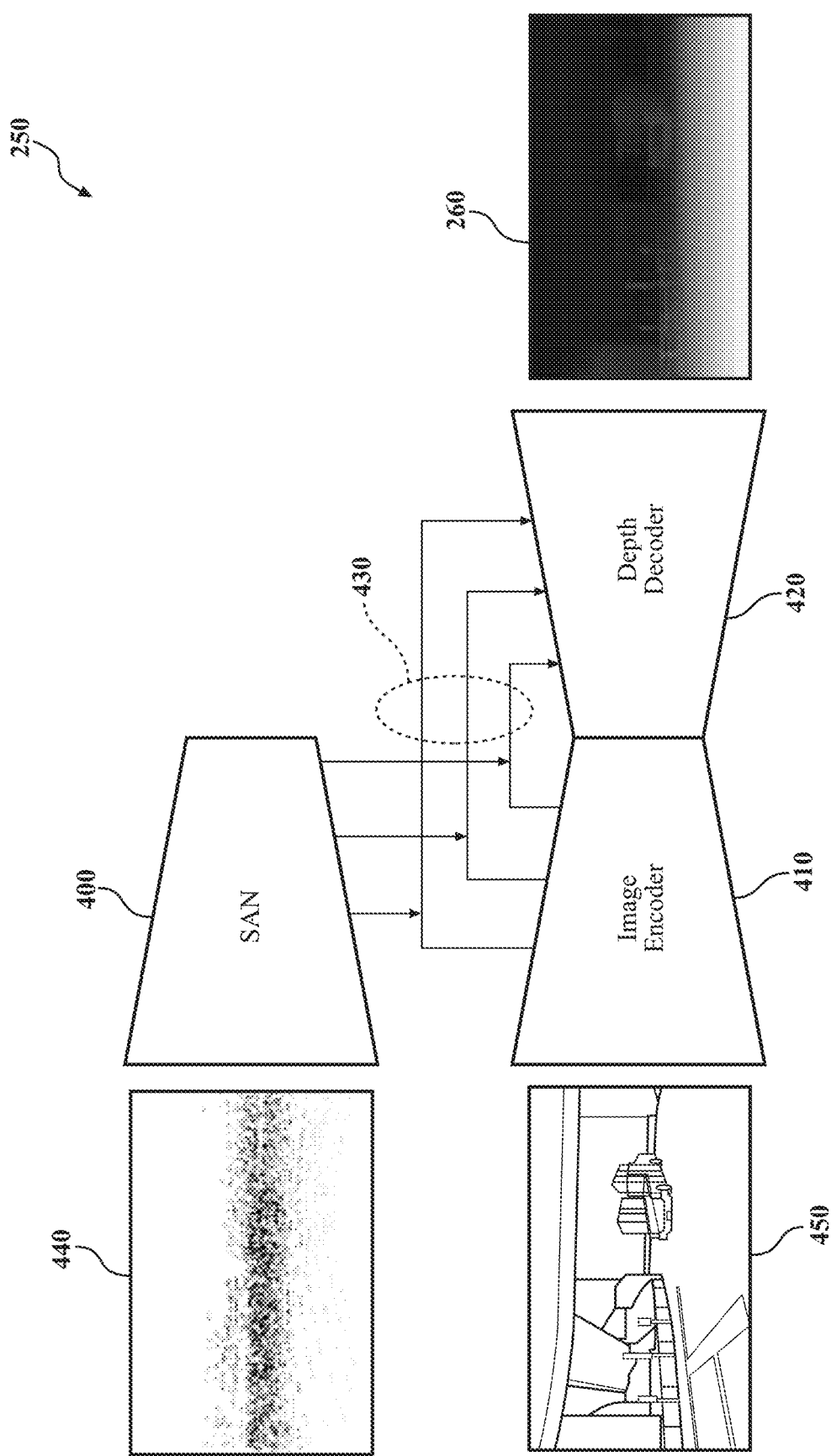
FIG. 4 illustrates a diagram of one embodiment of an architecture of a depth model.

Further detail about the depth system 170 of FIG. 2, including the depth model 250, will be provided in relation to FIG. 4 and subsequent figures. Thus, with reference to FIG. 4, one embodiment of the depth model 250 is shown. As illustrated in FIG. 4, the depth model 250 includes a sparse area network (SAN) 400, an image encoder 410, a depth decoder 420, and skip connections 430. It should be appreciated that while FIG. 4 illustrates the various aspects of the depth model 250 as being a separate component, in various aspects, the network module 220 includes instructions to apply the depth model 250, and the depth model 250 may be integrated with the network module 220.

In general, the network module 220 controls the depth model 250 to process the sensor data 250, which includes sparse depth data 440 and a monocular image 450, as shown in FIG. 4. However, it should be appreciated that the sparse depth data 440 may become unavailable due to various circumstances, such as a sensor failure. Accordingly, the depth model 250, in at least one arrangement, still functions but without the depth features from the SAN 400. That is, the image encoder 410 processes the monocular image 450, but depth features are not concatenated via the skip connections 430 into the depth decoder 420 to generate the depth map 260. In this way, the depth model 250 is flexible to continue operation when the sparse depth data 440 is unavailable.

In one configuration, the SAN 400 is a convolutional neural network (CNN). In further arrangements, the SAN 400 is configured with sparse convolutions, such as Minkowski convolutions. The SAN 400 may further include sparsification and densification layers, as will be discussed in greater detail subsequently. In any case, the SAN 400 produces depth features from the sparse depth data 440. The depth features are encoded features from the sparse depth data 440 that are provided at multiple different spatial resolutions. The different spatial resolutions correspond with spatial resolutions of image features from the image encoder 410 derived from the monocular image 450. Thus, as the SAN 400 processes the sparse depth data 440, the image encoder 410 processes the monocular image 450 of the same scene.

The skip connections 430 function to carry over the image features at varying spatial dimensions into depth decoder 420 as residual information. As part of this, the skip connections concatenate the depth features with the image features of respective corresponding spatial resolutions. Accordingly, while the depth decoder 420 receives a feature map of image features from the image encoder 410 and iteratively decodes the feature map through subsequent spatial dimensions, the skip connections provide the residual image features concatenated with the depth features into the respective iterations. In this way, the depth model 250 injects the sparse depth data 440 into the encoder/decoder structure and improves an accuracy of the depth map 260 as the final output.

Figure 5:
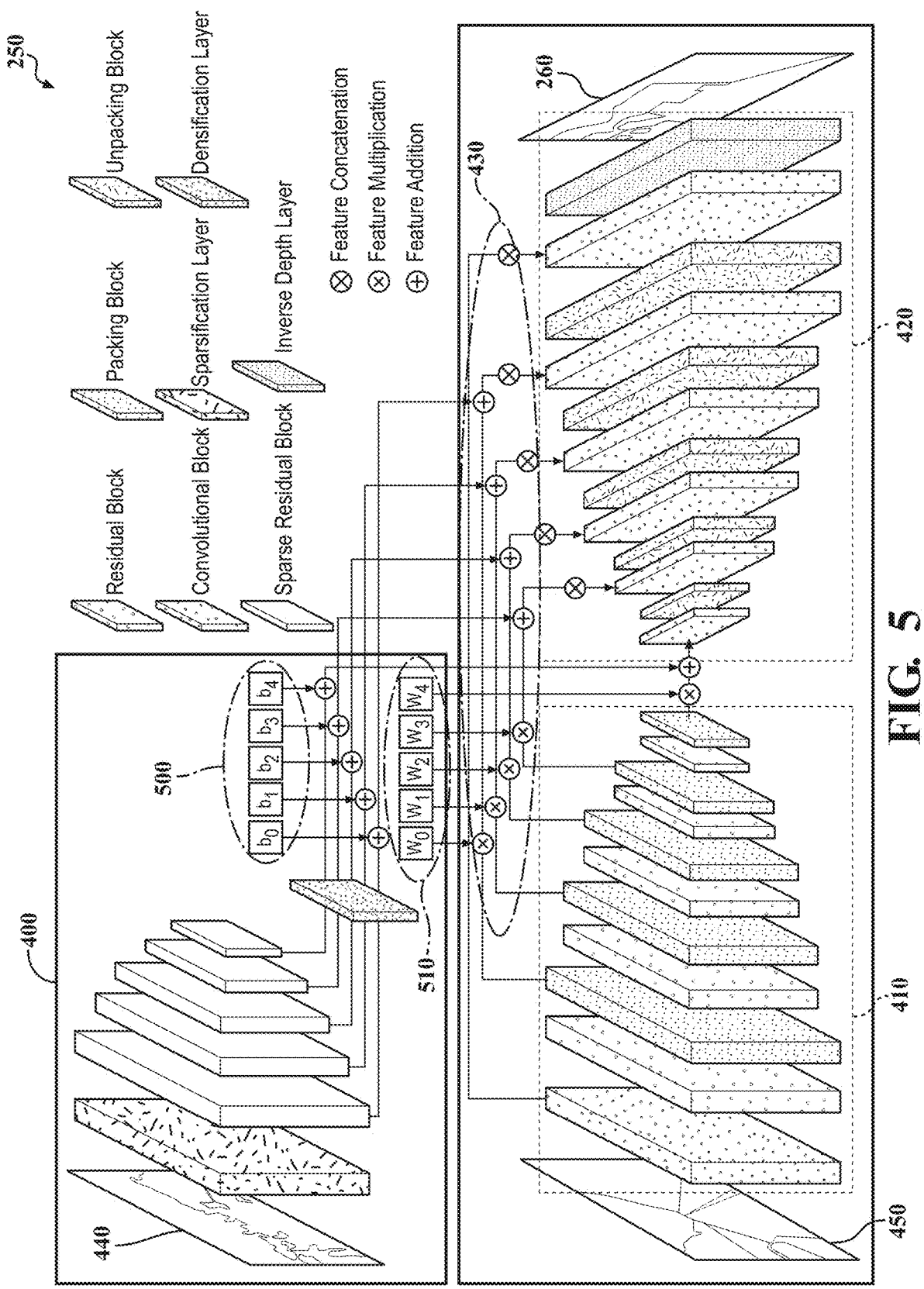
FIG. 5 illustrates a detailed diagram of one embodiment of a depth model.

As further detail about the depth model 250, consider FIG. 5, which illustrates a detailed view of the depth model 250. As shown in FIG. 5, the separate encoder/decoder structures 400, 410, and 420 are comprised of multiple different layers as set forth in the included legend. Moreover, the SAN 400 further includes learned weights 500 and 510. The learned weights 500 adjust the influence of the depth features while the learned weights 510 adjust the influence of the image features that are ultimately concatenated with information in the image decoder 420. By learning the weights 500 and 510 as part of training, the depth model 250 can better integrate the sparse depth data 440. Moreover, as previously noted, the SAN 400 can include Minkowski convolutions, a densification layer, and a sparsification layer.

As further explanation, a sparse tensor S is written as a coordinate matrix C and a feature matrix F, as shown in equation (1).

$$C = \begin{bmatrix} u_1 & v_1 & s_1 \\ \vdots & \vdots & \vdots \\ u_n & v_n & s_n \end{bmatrix}, F = \begin{bmatrix} f_1 \\ \vdots \\ f_n \end{bmatrix} \quad (1)$$

Where $\{u_n, v_n\}$ are pixel coordinates, $s_n$ is the sample index in the batch, and $f_n \in \mathbb{R}^Q$ is the corresponding feature vector. Assuming a batch size of 1 and disregard the batch index, an input W×H×1 depth map $\tilde{D}$ is sparsified by the sparsification layer by gathering valid pixels (i.e., pixels with positive values) as coordinates and depth values as features, such that:

$$\tilde{S} = \{\{u_n, v_n\}, \{d_n\}\} \forall u, v \in \tilde{D} | \tilde{D}(u,v) > 0.0 \quad (2)$$

Similarly, a sparse tensor $\tilde{S} = \{\tilde{C}, \tilde{F}\}$ can be densified by scattering its pixel coordinates and feature values into a dense W×H×Q matrix $\tilde{P}$, such that:

$$\tilde{P}(u_n, v_n) = \begin{cases} f_n & \text{if } \{u_n, v_n\} \in \tilde{C} \\ 0, & \text{otherwise.} \end{cases} \quad (3)$$

Once the input depth data is sparsified, the SAN 400 can encode the information through a series of novel Sparse Residual Blocks (SRB), which are generally comprised of sparse convolutional blocks (e.g., Minkowski convolutions). In any case, the depth features from the SAN 400 are encoded information about depths represented in the sparse depth data while the image features are, in general, aspects of the image that are indicative of spatial information that is intrinsically encoded therein. One example of an architecture for the encoding layers that form the image encoder 410 may include a series of layers that function to fold (i.e., adapt dimensions of the feature map to retain the features) encoded features into separate channels, iteratively reducing spatial dimensions of the image 450 while packing additional channels with information about embedded states of the features. The addition of the extra channels avoids the lossy nature of the encoding process and facilitates the preservation of more information (e.g., feature details) about the original monocular image 450.

Accordingly, in at least one approach, the image encoder 410 is comprised of multiple encoding layers formed from a combination of two-dimensional (2D) convolutional layers, packing blocks, and residual blocks. While the image encoder 410 is presented as including the noted components, it should be appreciated that further embodiments may vary the particular form of the encoding layers (e.g., convolutional and pooling layers without packing layers), and thus the noted configuration is one example of how the depth system 170 may implement the depth model 250.

The separate encoding layers generate outputs in the form of encoded feature maps (also referred to as tensors), which the encoding layers provide to subsequent layers in the depth model 250, including specific layers of an image decoder 420 via skip connections that may function to provide residual information between the image encoder 410 and the image decoder 420. Thus, the image encoder 410 includes a variety of separate layers that operate on the monocular image 450, and subsequently on derived/intermediate feature maps that convert the visual information of the monocular image 450 into embedded state information in the form of encoded features of different channels. In any case, the output of the image encoder 410 is, in one approach, a feature map having a particular dimension (e.g., 512×H/32× W/32) that is transformed in relation to the image 450 (e.g., 3×H×W).

With continued reference to FIG. 5, the depth model 250 further includes the image decoder 420. One example of how the image decoder 420 functions includes unfolding (i.e., adapting dimensions of the tensor to extract the features) the previously encoded spatial information in order to derive the depth map 260 according to learned correlations associated with the encoded features. That is, the decoding layers generally function to up-sample, through sub-pixel convolutions and other mechanisms, the previously encoded features into the depth map 260. In one or more arrangements, the decoding layers comprise unpacking blocks, two-dimensional convolutional layers, and inverse depth layers that function as output layers for different spatial scales. In further aspects, the image decoder 420 may also receive inputs via the skip connections 430 from another model, such as the SAN 400. While the image decoder 420 is presented as including the noted components, it should be appreciated that further arrangements may vary the particular form of the decoding layers (e.g., deconvolutional layers without unpacking layers), and thus the noted configuration is one example of how the depth system 170 may implement the image decoder 420.

In any case, returning to FIG. 2, the depth system 170, in one embodiment, employs the depth model 250 to produce the depth map 260, which, in one or more arrangements, may be provided as an inverse mapping having inverse values for the depth estimates. In general, however, the depth map 260 is a pixel-wise prediction of depths for the image 450. That is, the depth model 250 provides estimates of depths for different aspects depicted in the image 450. Of course, in the present approach, the depth model 250 further integrates information from the sparse depth data 440 to supplement the image 450 in producing the depth map 260.

It should be appreciated that, in one embodiment, the network module 220 generally includes instructions that function to control the processor 110 to execute various actions to control the depth model 250 to produce the depth map 260. The network module 220, in one or more approaches, acquires the sensor data 240 including the sparse depth data 440 and the monocular image 450 by controlling the camera 126 and a LiDAR 124 to capture the sensor data 240 from a data bus, or electronic memory, or another available communication pathway. Accordingly, the depth system 170 may acquire the sparse depth data in parallel with the monocular image to provide corresponding sparse depth information for the image.

Figure 6:
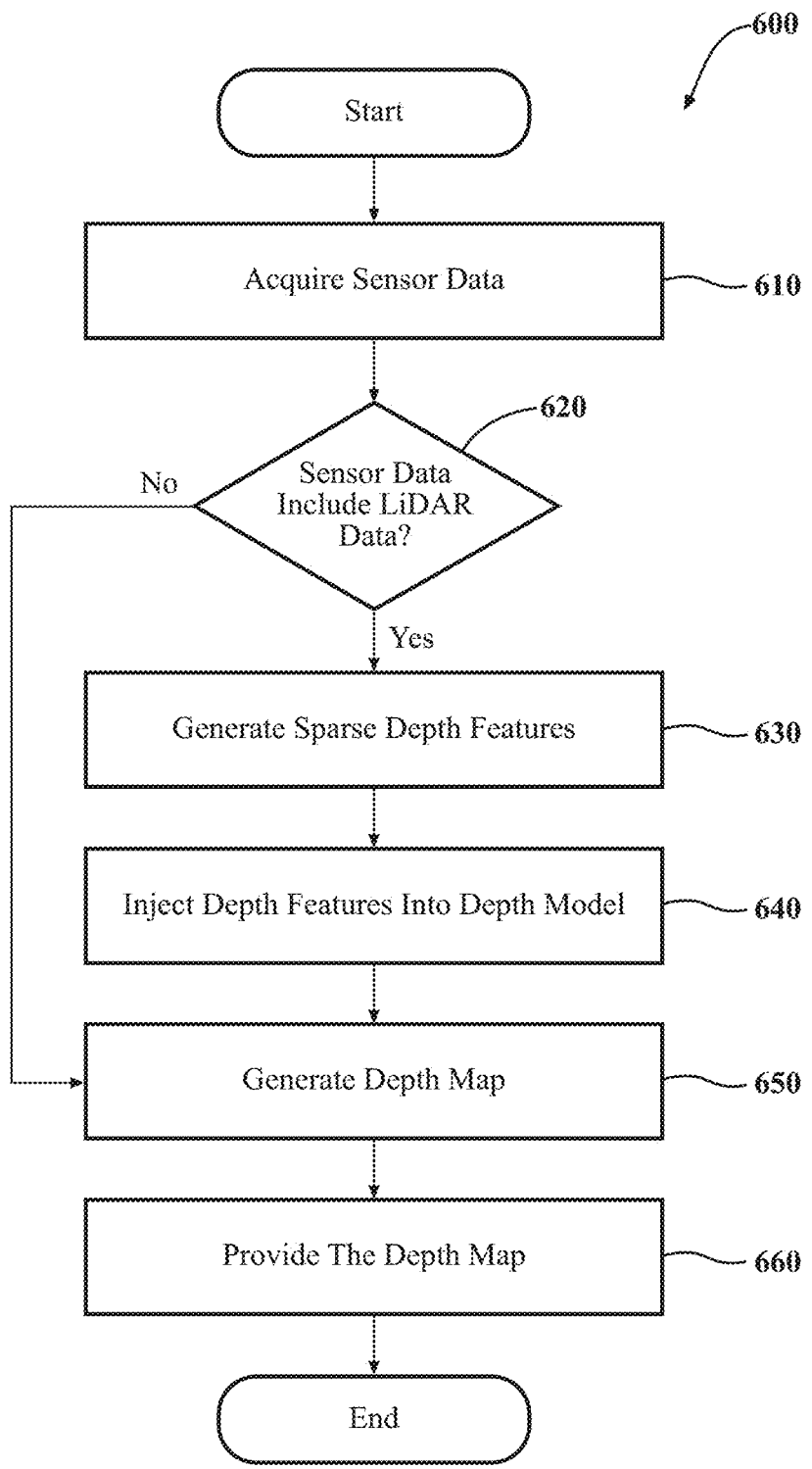
FIG. 6 illustrates a flowchart of one embodiment of a method associated with generating depth maps using a depth model that can use monocular images and sparse depth data.

Additional aspects of the joint learning of depth prediction and depth completion will be discussed in relation to FIG. 6. FIG. 6 illustrates a flowchart of a method 600 that is associated with generating depth maps using a depth model that can use both monocular images and sparse depth data as an input. Method 600 will be discussed from the perspective of the depth system 170 of FIGS. 1-2. While method 600 is discussed in combination with the depth system 170, it should be appreciated that the method 600 is not limited to being implemented within the depth system 170 but is instead one example of a system that may implement the method 600.

At 610, the network module 220 acquires the sensor data 240. In general, the sensor data 240 is comprised of at least a monocular image (e.g., image 450), but may also include, as previously outlined, sparse depth data. The sparse depth data can be LiDAR data or depth data from another source, such as a radar. In any case, the sparse depth data provides a mechanism by which the depth system 170 can integrate further information about the surrounding environment in order to guide the generation of the depth map 260 and improve the quality of the depth estimates included therein.

At 620, the network module 220 determines whether the sensor data 240 includes sparse depth data in addition to the monocular image. For example, as noted previously, the sensor data 240 may not include the sparse depth data for various reasons, such as an error in an associated range sensor, a slower refresh rate than the camera 126, processing errors, an absence of a range sensor, and so on. Thus, the network module 220 can determine when the sensor data 240 includes the sparse depth data by, for example, analyzing the sensor data 240 for the presence of the sparse depth data as the network module 220 receives the sensor data 240, e.g., by identifying the sparse depth data, reading a designated header value in a packet including the sensor data 240, etc.

In any case, the network module 220 can determine the presence of the sparse depth data and may, in one or more arrangements, activate the SAN 400 to generate the depth features from the sparse depth data when the sparse depth data is present. Activating the network module 220 may include providing the sparse depth data to the SAN 400 for processing.

At 630, the network module 220 generates depth features from the sensor data 240 according to whether the sensor data 240 includes sparse depth data. That is, the network module 220 selectively performs the task of generating the depth features according to the presence of the sparse depth data. Thus, when the sparse depth data is present, the network module 220 uses the SAN 400 to generate the depth features from the sparse depth data. It should be appreciated that while the use of the SAN 400 is discussed sequentially prior to generating the depth map 260 by the depth model 250, the SAN 400 can execute in parallel with further components of the depth model 250 (e.g., image encoder 410) in order to provide depth features to the image decoder 420 in parallel with the image features.

At 640, the network module 220 injects the depth features into the depth model 250. For example, the network module 220 injects the depth features by concatenating the depth features with the image features and providing concatenated features into the image decoder 420 of the depth model 250. Moreover, the network module 220 can further apply learned weights to the depth features and the image features prior to concatenating the separate features via skip connections of the depth model 250. In general, injecting the sparse depth data via the depth features using the skip connections is an optimal approach to integrating this information and provides for performing depth completion and prediction without degradation of either process. Thus, the learnable weights provide for further conditioning the depth and image features, thereby enabling switching between tasks.

At 650, the network module 220 generates a depth map from at least the monocular image 450 using the depth model 250 that is selectively guided by the depth features when injected. That is, as shown in the flowchart of FIG. 6, the network module 220 can generate the depth map 260 without using the sparse depth data by using the monocular image alone. However, when available, the addition of the sparse depth data generally improves the accuracy of the depth map 260. As noted in relation to FIGS. 4-5, the network module 220 applies the depth model 250 to the monocular image by using the image encoder 410 to encode image features and uses the depth decoder 420 to decode the image features, and the depth features into the depth map 260. In this way, the network module 220 generates the depth map 260 as a dense representation of depths for a depicted scene of the surrounding environment.

At 660, the network module 220 provides the depth map 260 as depth estimates of objects represented in the monocular image. In one arrangement, the network module 220 provides the depth map 260 to control a device (e.g., the vehicle 100) to navigate through a surrounding environment. As should be appreciated, in one arrangement, the network module 220 electronically provides the map 260 to other systems of the vehicle 100 in support of, for example, autonomous planning and navigation of the vehicle 100. Of course, in further implementations, the network module 220 communicates the map 260 to a remote device that originally provides the sensor data 240 as a response to an original request for depth information. In general, the depth system 170 and the depth model 250 can be employed in various contexts in support of active autonomous navigation, scene analysis, metadata analysis (e.g., traffic analysis), and so on. In either case, the approach embodied within the depth system 170 provides a unique and improved approach to leveraging monocular images in combination with sparse depth data to resolve high-resolution dense depth data that is metrically accurate.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system, comprising:
one or more processors;
a memory communicably coupled to the one or more processors and storing:
a network module including instructions that, when executed by the one or more processors, cause the one or more processors to:
generate depth features from sensor data according to whether the sensor data includes sparse depth data, including encoding the sparse depth data from a range sensor to form the depth features,
selectively inject the depth features into a depth model via skip connections of the depth model when the depth features are available according to a presence of the sparse depth data in the sensor data,
generate a depth map from at least a monocular image using the depth model that is guided by the depth features representing explicit depths from the range sensor when injected, and
provide the depth map as depth estimates of objects represented in the monocular image.

2. The depth system of claim 1, wherein the network module includes instructions to generate the depth features including instructions to use a sparse auxiliary network that is a convolutional encoder to generate the depth features from the sparse depth data during inference, and wherein the sparse depth data is part of the sensor data that is acquired from the range sensor.

3. The depth system of claim 1, wherein the network module includes instructions to selectively inject the depth features including instructions to, in response to determining that the sensor data includes the sparse depth data, inject the depth features into the depth model by concatenating the depth features with image features from an encoder of the depth model and provide concatenated features into a decoder of the depth model.

4. The depth system of claim 3, wherein the network module includes instructions to inject the depth features including instructions to apply learned weights to the depth features and the image features prior to concatenating via the skip connections of the depth model.

5. The depth system of claim 1, wherein the network module includes instructions to generate the depth map including instructions to apply the depth model to the monocular image by using an encoder of the depth model to encode image features and to use a decoder of the depth model to decode the depth features into the depth map, and
wherein the network module includes instructions to decode the image features at separate spatial resolutions as provided by the skip connections between the encoder and the decoder in combination with an output of a previous layer of the decoder.

6. The depth system of claim 1, wherein the network module includes instructions to acquire the sensor data including at least the monocular image from at least one sensor of a device,
wherein the network module includes instructions to generate the depth features including instructions to determine whether the sensor data includes sparse depth data in addition to the monocular image and activating a sparse auxiliary network to generate the depth features from the sparse depth data when the sparse depth data is present.

7. The depth system of claim 1, wherein providing the depth map includes controlling a device to navigate through a surrounding environment according to the depth map that identifies distances to objects in the surrounding environment.

8. The depth system of claim 1, wherein the depth system is integrated within a device for autonomously controlling a vehicle.

9. A non-transitory computer-readable medium including instructions that, when executed by one or more processors cause the one or more processors to:
generate depth features from sensor data according to whether the sensor data includes sparse depth data, including encoding the sparse depth data from a range sensor to form the depth features,
selectively inject the depth features into a depth model via skip connections of the depth model when the depth features are available according to a presence of the sparse depth data in the sensor data,
generate a depth map from at least a monocular image using the depth model that is guided by the depth features representing explicit depths from the range sensor when injected, and
provide the depth map as depth estimates of objects represented in the monocular image.

10. The non-transitory computer-readable medium of claim 9, wherein the instructions to generate the depth features include instructions to use a sparse auxiliary network that is a convolutional encoder to generate the depth features from the sparse depth data, and wherein the sparse depth data is part of the sensor data that is acquired from a range sensor.

11. The non-transitory computer-readable medium of claim 9, wherein the instructions to selectively inject the depth features include instructions to, in response to determining that the sensor data includes the sparse depth data, inject the depth features into the depth model by concatenating the depth features with image features from an encoder of the depth model and provide concatenated features into a decoder of the depth model.

12. The non-transitory computer-readable medium of claim 11, wherein the instructions to inject the depth features include instructions to apply learned weights to the depth features and the image features prior to concatenating via the skip connections of the depth model.

13. The non-transitory computer-readable medium of claim 9, wherein instructions to generate the depth map include instructions to apply the depth model to the monocular image by using an encoder of the depth model to encode image features and to use a decoder of the depth model to decode the depth features into the depth map, and
wherein the instructions to decode the image features at separate spatial resolutions as provided by the skip connections between the encoder and the decoder in combination with an output of a previous layer of the decoder.

14. A method, comprising:
generating depth features from sensor data according to whether the sensor data includes sparse depth data, including encoding the sparse depth data from a range sensor to form the depth features;
selectively injecting the depth features into a depth model via skip connections of the depth model when the depth features are available according to a presence of the sparse depth data in the sensor data;
generating a depth map from at least a monocular image using the depth model that is guided by the depth features representing explicit depths from the range sensor when injected; and providing the depth map as depth estimates of objects represented in the monocular image.

15. The method of claim 14, wherein generating the depth features includes using a sparse auxiliary network that is a convolutional encoder to generate the depth features from the sparse depth data during inference, and wherein the sparse depth data is part of the sensor data that is acquired from a range sensor.

16. The method of claim 14, wherein selectively injecting the depth features includes, in response to determining that the sensor data includes the sparse depth data, injecting the depth features into the depth model by concatenating the depth features with image features from an encoder of the depth model and providing concatenated features into a decoder of the depth model.

17. The method of claim 16, wherein injecting the depth features includes applying learned weights to the depth features and the image features prior to concatenating via the skip connections of the depth model.

18. The method of claim 14, wherein generating the depth map includes applying the depth model to the monocular image by using an encoder of the depth model to encode image features and to use a decoder of the depth model to decode the depth features into the depth map, and wherein using the decoder includes decoding the image features at separate spatial resolutions as provided by the skip connections between the encoder and the decoder in combination with an output of a previous layer of the decoder.

19. The method of claim 14, further comprising:
acquiring the sensor data including at least the monocular image from at least one sensor of a device, wherein generating the depth features includes determining whether the sensor data includes sparse depth data in addition to the monocular image and activating a sparse auxiliary network to generate the depth features from the sparse depth data when the sparse depth data is present.

20. The method of claim 14, wherein providing the depth map includes controlling a device to navigate through a surrounding environment according to the depth map that identifies distances to objects in the surrounding environment.

* * * * *